Feb. 21, 1939.　　　C. A. FINE　　　2,147,835
LUBRICATING APPARATUS
Filed June 14, 1935　　2 Sheets-Sheet 1
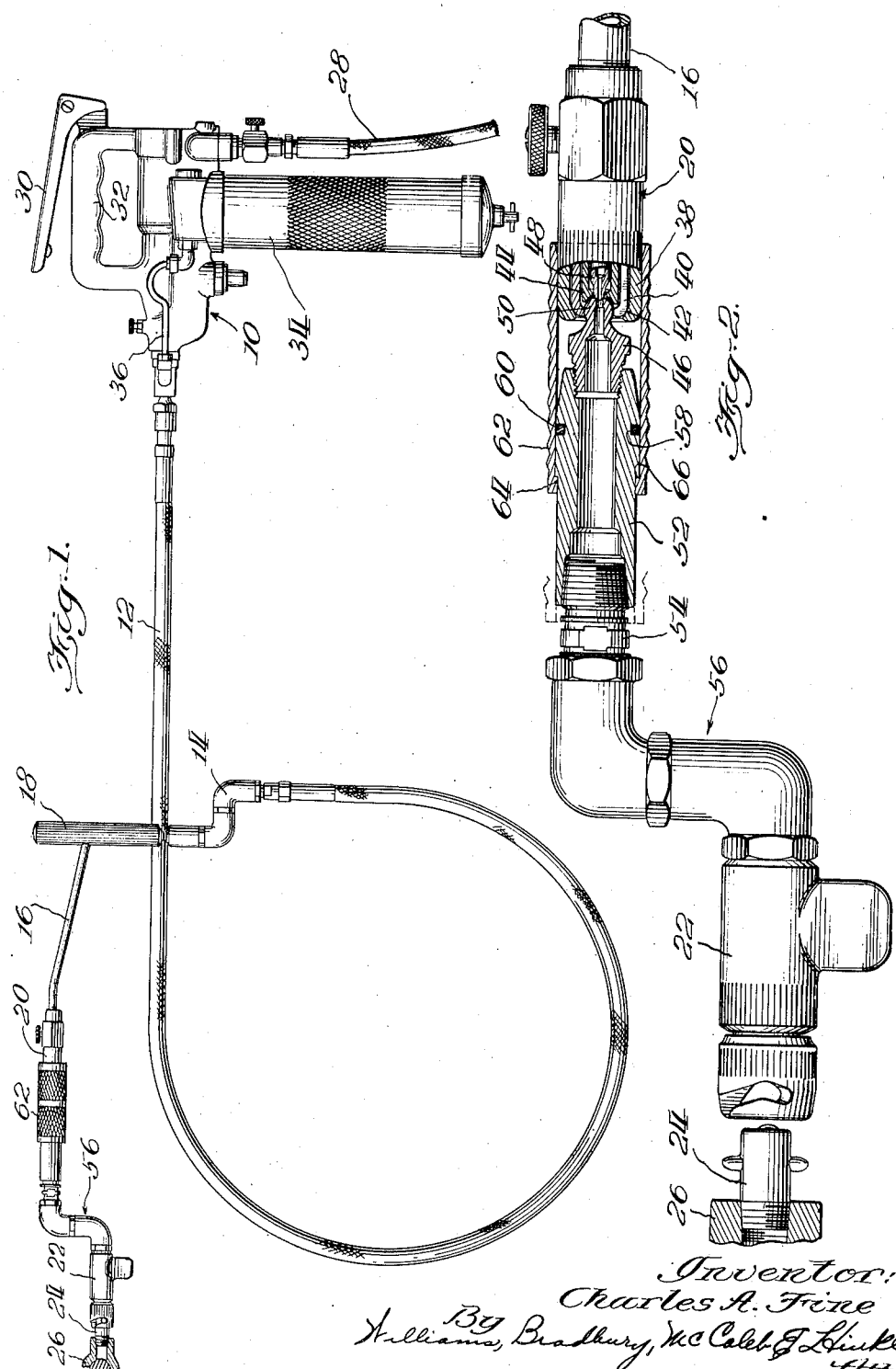

Feb. 21, 1939.   C. A. FINE   2,147,835
LUBRICATING APPARATUS
Filed June 14, 1935   2 Sheets-Sheet 2
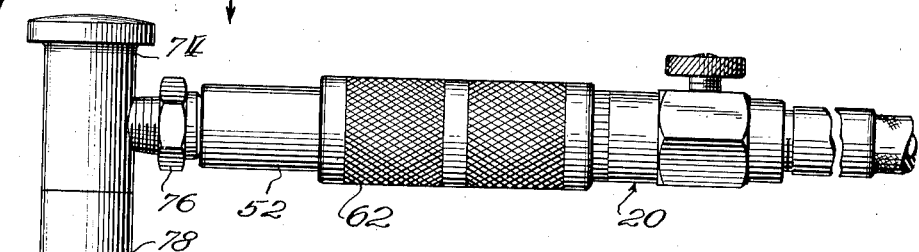
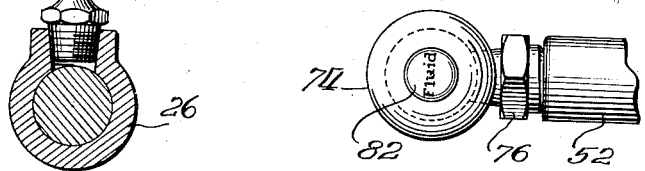
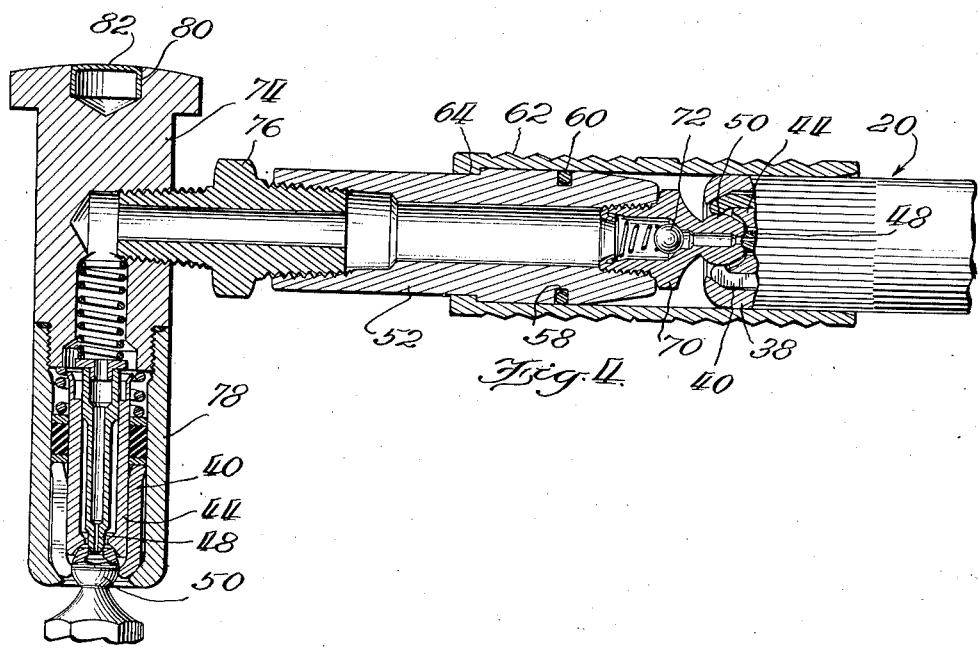

Patented Feb. 21, 1939

2,147,835

UNITED STATES PATENT OFFICE 2,147,835

LUBRICATING APPARATUS

Charles A. Fine, Chicago, Ill., assignor to Stewart-Warner Corporation, Chicago, Ill., a corporation of Virginia Application June 14, 1935, Serial No. 26,572

1 Claim. (Cl. 285—161)

My invention relates generally to lubricating apparatus, and more particularly to improvements in adapters or connectors for making lubricant tight connections with lubricant receiving fittings.

It is an object of my invention to provide an improved adapter for high pressure lubricating systems, by which the successive connection of a high pressure lubricant supply to the lubricant receiving fittings will be greatly facilitated.

Other objects will appear from the following description, reference being had to the accompanying drawings, in which—

Fig. 1 is an elevation of a lubricant compressor, its discharge hose, coupler, and adapter, shown connected to a lubricant receiving fitting carried by a bearing, the latter being shown in section;

Fig. 2 is a similar view on an enlarged scale, showing only the coupler, adapter, and fitting, portions of the coupler and adapter being shown in central longitudinal section;

Fig. 3 is an elevation of a modified form of the adapter of my invention showing it connected to a lubricant receiving fitting threaded in a bearing, the latter being shown in section;

Fig. 4 is a central longitudinal sectional view of the adapter shown in Fig. 3; and Fig. 5 is a fragmentary plan view taken on the line 5—5 of Fig. 3.

The adapter of my invention may be used in any high pressure lubricating system and in Fig. 1, for purposes of illustration, is shown connected in such system comprising a lubricant compressor 10, a discharge hose 12, a swivel 14, an extension pipe 16 threaded in a suitable handle 18, a coupler 20, and adapter 22. The adapter 22 is shown as connected with a lubricant receiving fitting 24 of the type customarily referred to as a "pin fitting" by virtue of the fact that it has a pin extending transversely therethrough. The pin fitting 24 is threaded into the oil hole of a bearing 26.

The compressor 10 may be of any suitable construction, but is shown as a pneumatically operated compressor having air under pressure supplied thereto through a hose 28, the air being controlled by a valve lever 30 pivoted to the handle 32. The compressor also includes a lubricant reservoir 34 and a by-pass pipe 36 for relieving the lubricant pressure in the discharge line 12. Inasmuch as the details of the compressor form no part of my present invention, further detailed description thereof will be omitted.

As best shown in Fig. 2, the coupler 20 comprises a sleeve 38 within which jaws 40 are positioned. The jaws 40 and sleeve 38 have interengaging conical surfaces 42 and the jaws 40 are pressed outwardly from the sleeve 38 by the pressure of the lubricant. A nozzle member 44 is likewise pressed by lubricant pressure against the annular edge of the end face of a fitting 46 and a sealing member 48 is pressed by lubricant pressure to make a sealing contact with the end face of the fitting 46 at the edge surrounding its inlet opening. The jaws 40 engage behind the head 50 of the fitting. The details of the coupler 20 are fully illustrated and described in the copending application of Ernest W. Davis and Lynn A. Williams, Jr., Serial No. 3,712, filed January 28, 1935 which has matured into Patent No. 2,061,062, dated Nov. 17, 1936.

The fitting 46 is threaded into an extension 52 which in turn is threaded to a union 54 which forms part of a swivel 56. The extension 52 has an annular groove 58 formed in the external surface thereof to receive a C spring 60. A sleeve 62 is longitudinally slidable upon the extension 52, outward movement thereof being limited by the engagement of a shoulder 64 on the sleeve with a complementary shoulder 66 formed on the extension 52. The spring 60 presses outwardly against the inner surface of the sleeve 62, thereby frictionally to hold it in any position to which it may be moved.

In Fig. 2 the sleeve is shown in its rightmost position, in which position its outer end encompasses a substantial portion of the sleeve 38 of the coupler 20, and in this position maintains the coupler 20 in axial alignment with the fitting 46. The coupler 20 can be disconnected from the fitting only by swinging it angularly relative to the fitting and since such angular swinging movement of the coupler relative to the fitting is prevented by the sleeve 62, the coupler is maintained locked to the fitting whenever the sleeve is in the position shown in Fig. 2. To enable the operator to disengage the coupler 20 from the fitting 46, the sleeve 62 is moved to the left (Fig. 2) to the position in which it is shown in dotted lines in Fig. 2, in which position it no longer engages the sleeve 38 of the coupler 20 and the latter is therefore free to be swung out of axial alignment with the fitting 46 and thereby disconnect the coupler from the fitting.

The extension 52 is shown as being connected through the union 54 and swivel 56 with a coupler 22 of a form adapted to make a sealed connection with the pin fitting 24. Couplers of this type are shown in the patent to A. V. Gullborg No. 1,307,734, dated June 24, 1919. If desired a different type of coupling could be connected to the swivel 56 and thus the adapter conditioned for supplying lubricant to different types of lubricant receiving fittings.

Inasmuch as the sleeve 62 is held by the spring 60 in the position to which it is adjusted, accidental disconnection of the coupler 20 from the fitting 46 will be prevented so that the person using the grease gun need give the coupler 20 no further attention but can use the coupler 22 in the same manner as if it were directly connected to the discharge hose 12. By merely sliding the sleeve 62 inwardly relative to the extension 52 (to the left, Fig. 2) the coupler 20 may readily be disconnected from the fitting 46, and then be used for lubricating directly bearings equipped with lubricant receiving fittings of the type exemplified by the fitting 46. It will be understood that in the lubrication of automobiles it is very desirable to be able quickly and easily to convert a lubricant compressor equipped for the lubrication of one type of fitting to the lubrication of a different type of fitting, since different automobiles are equipped with different types of lubricant receiving fittings. It is also essential that the change be capable of being made very rapidly and without the loss of lubricant. The adapter of my invention satisfies all of these requirements.

In Figs. 3, 4, and 5 I have illustrated a modified form of my invention for use in the lubrication of machinery equipped with headed type fittings where such fittings are located in relatively inaccessible places such that they cannot be reached by the coupler 20.

In this modified form of my invention parts which are similar to those previously described in connection with Figs. 1 and 2 are identified with similar reference characters. The extension 52 has a fitting 70 threaded therein, the fitting being of the same type as that used in the construction shown in Fig. 2 except that it is provided with a spring pressed check valve 72. If desired, however, this check valve may be omitted. The extension 52 is secured to a body 74 by a union 76. The body 74 has a coupling sleeve 78 threaded at one end thereof, this sleeve enclosing the coupling jaws and sealing members similar to or identical with those described as part of the coupler 20. The end of the body 74 opposite the coupler 78 has a recess 80 formed therein which is adapted to receive an identifying marker 82. As shown in Fig. 5, this marker bears the legend "Fluid", thus indicating the kind of lubricant with which the adapter is to be used.

It will be understood that in a modern service station for automobiles it is customary to render what is termed "Specialized Lubrication", that is, each of the different types of bearings is lubricated with a grease or oil especially suited to such type of bearing, and the marker 82 serves as a means to aid readily in identifying the adapter to be used with each of the different lubricant compressors containing the different types of lubricants. If such identifying marking were not provided the service station attendant might inadvertently connect an adapter, passageways of which contain a chassis grease, to a compressor delivering an oil and thus deliver the chassis grease from the passageways in the adapter to the bearing. The markers 82 are in the form of pressed sheet metal cups which fit frictionally in the recesses 80 of the adapters.

By means of the adapter shown in Figs. 3, 4, and 5, bearings which would not be readily accessible with the use of the coupler 20, may be easily reached. The sleeve 62 forms a rigid connecting member between the coupler 20 and the extension 52 so that the coupler 78 may be readily attached to and disconnected from a lubricant receiving fitting, using the coupler 20 and sleeve 62 as a handle.

It will be understood by those skilled in the art that variations may be made in the form of my invention without departing from the basic principles thereof, and I desire to include within the scope of my invention all such modifications and variations as will be readily apparent to those skilled in the art.

What I claim as new and desire to secure by Letters Patent of the United States is:

In a high pressure lubricating system, the combination of a coupler, an adapter comprising an extension having a fitting at one end thereof, said fitting being readily engageable with said coupler to make a lubricant tight connection therewith, the connection being of a type in which disconnection is effected readily by swinging the coupler relative to the axis of the fitting, a sleeve carried by said adapter and slidable on said extension said sleeve having an internal diameter substantially the same as the outer diameter of said coupler and constructed and arranged when moved to one position to embrace said coupler and hold it in axial alignment with said fitting thereby to prevent disconnection of the coupler and fitting, means to hold said sleeve in any one of a plurality of positions to which it may be moved relative to said extension, and means connected to said extension for making a detachable lubricant-tight connection with a lubricant receiving fitting.

CHARLES A. FINE.